United States Patent
Singi et al.

(10) Patent No.: US 11,743,119 B1
(45) Date of Patent: Aug. 29, 2023

(54) DETERMINING A RECOMMENDED HYBRID CLOUD COMPUTING ENVIRONMENT FOR AN APPLICATION ON DEMAND

(71) Applicant: Accenture Global Solutions Limited, Dublin (IE)

(72) Inventors: Kapil Singi, Bangalore (IN); Kuntal Dey, Birbhum (IN); Vikrant Kaulgud, Pune (IN); Vibhu Saujanya Sharma, Bangalore (IN)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 17/940,516

(22) Filed: Sep. 8, 2022

(51) Int. Cl.
  *G06F 15/173* (2006.01)
  *H04L 41/0816* (2022.01)
  *H04L 67/00* (2022.01)

(52) U.S. Cl.
  CPC .......... *H04L 41/0816* (2013.01); *H04L 67/34* (2013.01)

(58) Field of Classification Search
  None
  See application file for complete search history.

(56) References Cited

U.S. PATENT DOCUMENTS

| | | | |
|---|---|---|---|
| 10,949,406 B1* | 3/2021 | Calvo | G06F 16/215 |
| 11,061,718 B2* | 7/2021 | Vukovic | H04L 67/1012 |
| 2014/0149494 A1* | 5/2014 | Markley | H04L 41/04 |
| | | | 709/203 |
| 2021/0174280 A1* | 6/2021 | Ratnapuri | H04L 67/51 |
| 2021/0224298 A1* | 7/2021 | Singi | G06N 20/00 |
| 2022/0182454 A1* | 6/2022 | Qiao | G06F 11/3065 |
| 2023/0099153 A1* | 3/2023 | Allen | G06Q 10/06313 |
| | | | 705/7.23 |

\* cited by examiner

*Primary Examiner* — Phuoc H Nguyen
(74) *Attorney, Agent, or Firm* — Harrity & Harrity, LLP

(57) ABSTRACT

A device may receive application data identifying an application to be executed by a hybrid cloud computing environment and constraint data identifying constraints associated with the hybrid cloud computing environment. The device may select objectives based on the application data and the constraint data, and may identify factors associated with the objectives. The device may correlate the factors with potential data centers, and may apply weights to the correlated factors to generate correlated factor scores. The device may identify a list of data centers based on the correlated factor scores, and may determine a reduced list of data centers. The device may apply a preference technique to the reduced list of data centers to generate a ranked list of data centers, and may determine the hybrid cloud computing environment based on the ranked list of data centers. The device may perform actions based on the hybrid cloud computing environment.

20 Claims, 11 Drawing Sheets

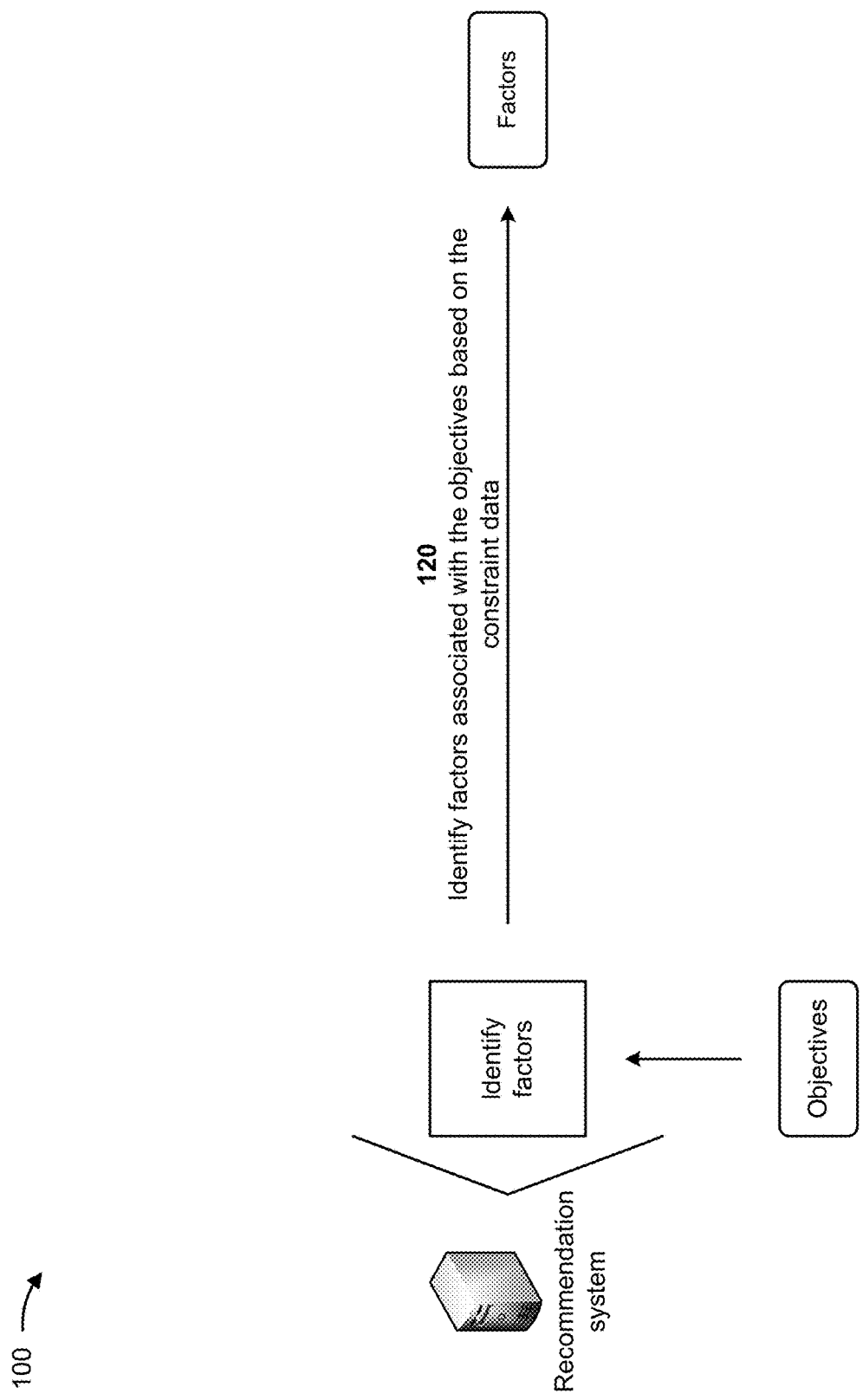

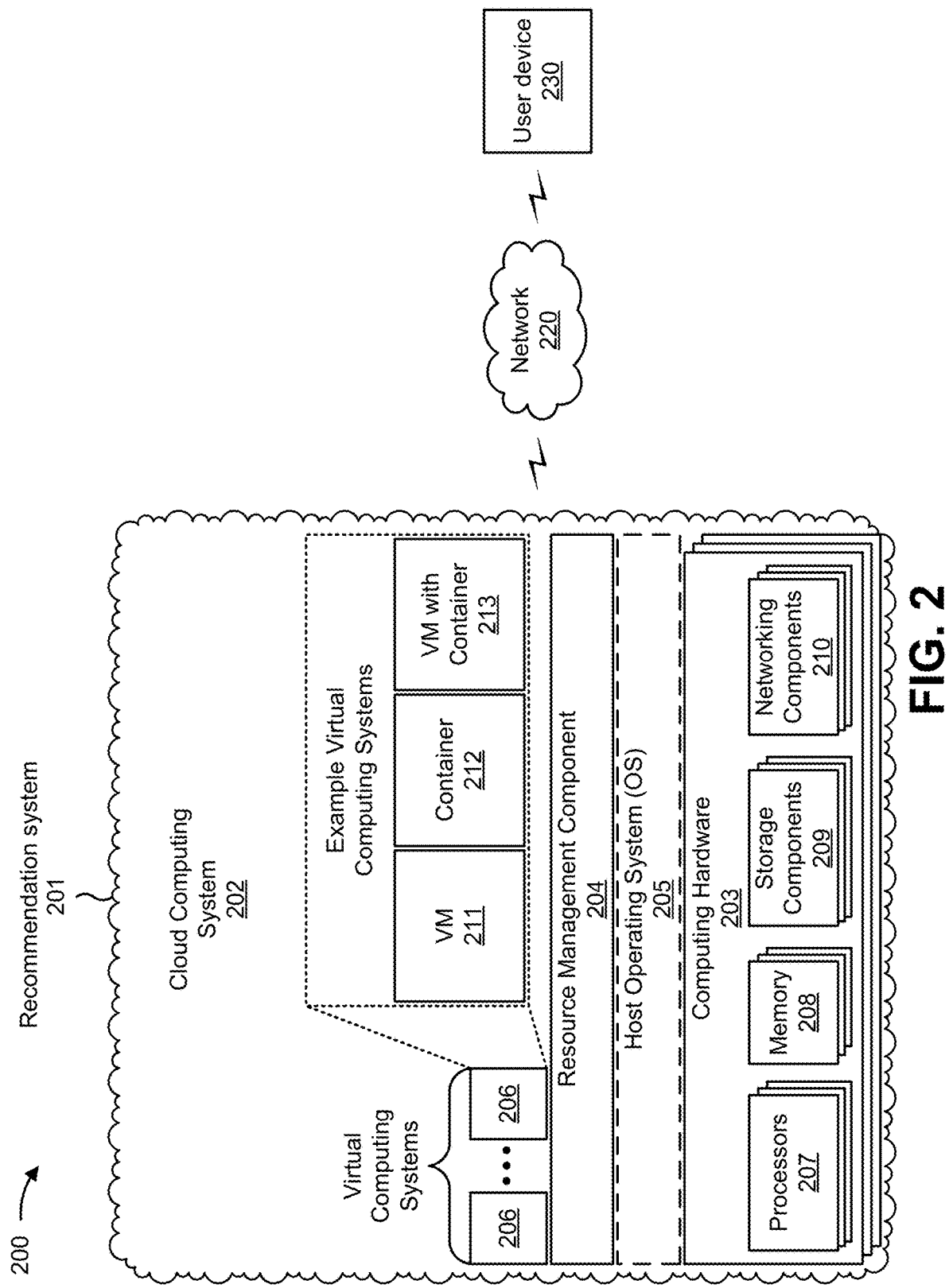

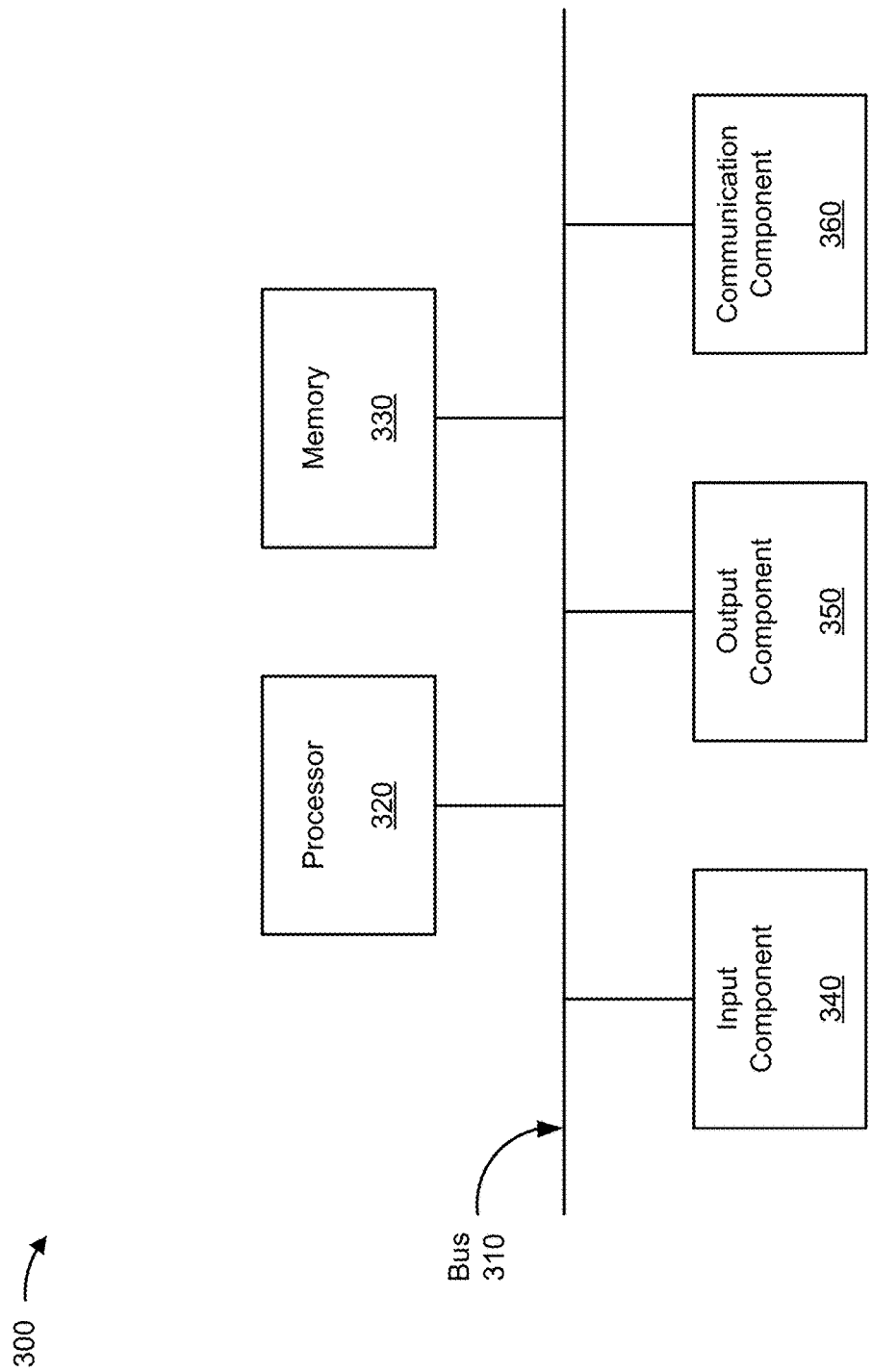

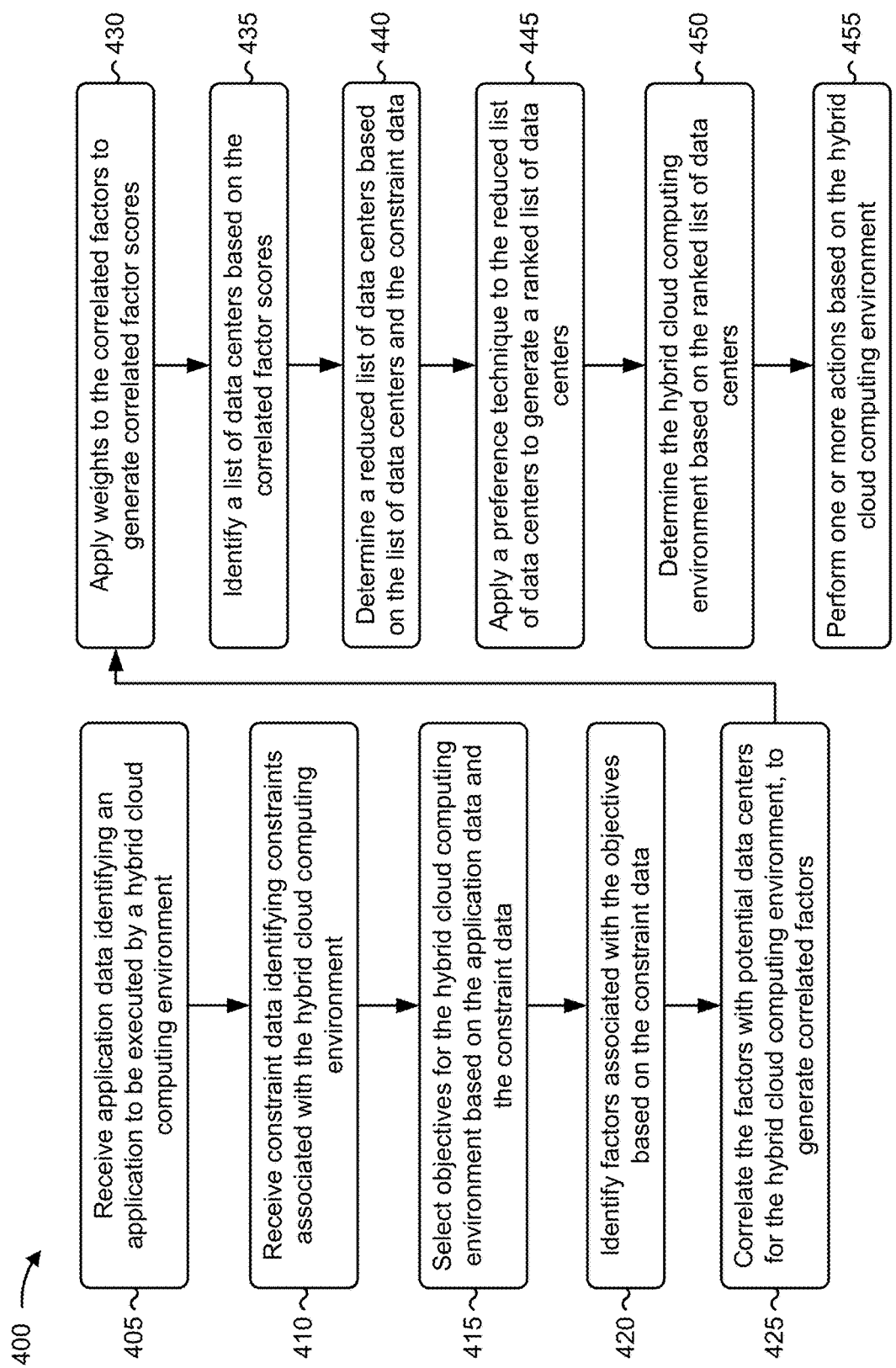

DETERMINING A RECOMMENDED HYBRID CLOUD COMPUTING ENVIRONMENT FOR AN APPLICATION ON DEMAND

BACKGROUND

An application of an entity (e.g., a corporation, a government entity, and/or the like) may execute on premise via one or more on premise servers or an on premise cloud computing environment; off premise via an off premise cloud computing environment; and/or via a hybrid cloud computing environment via an on premise cloud computing environment and an off premise cloud computing environment.

SUMMARY

Some implementations described herein relate to a method. The method may include receiving application data identifying an application to be executed by a hybrid cloud computing environment, and receiving constraint data identifying constraints associated with the hybrid cloud computing environment. The method may include selecting objectives for the hybrid cloud computing environment based on the application data and the constraint data, and identifying factors associated with the objectives based on the constraint data. The method may include correlating the factors with potential data centers for the hybrid cloud computing environment, to generate correlated factors, and applying weights to the correlated factors to generate correlated factor scores. The method may include identifying a list of data centers based on the correlated factor scores, and determining a reduced list of data centers based on the list of data centers and the constraint data. The method may include applying a preference technique to the reduced list of data centers to generate a ranked list of data centers, and determining the hybrid cloud computing environment based on the ranked list of data centers. The method may include performing one or more actions based on the hybrid cloud computing environment.

Some implementations described herein relate to a device. The device may include one or more memories and one or more processors coupled to the one or more memories. The one or more processors may be configured to receive application data identifying an application to be executed by a hybrid cloud computing environment, and receive constraint data identifying constraints associated with the hybrid cloud computing environment. The one or more processors may be configured to select objectives for the hybrid cloud computing environment based on the application data and the constraint data, and identify correlated factors associated with the objectives based on the constraint data, where the correlated factors are correlated with potential data centers for the hybrid cloud computing environment. The one or more processors may be configured to apply weights to the correlated factors to generate correlated factor scores, and identify a list of data centers based on the correlated factor scores. The one or more processors may be configured to determine a reduced list of data centers based on the list of data centers and the constraint data, and apply a preference technique to the reduced list of data centers to generate a ranked list of data centers. The one or more processors may be configured to determine the hybrid cloud computing environment based on the ranked list of data centers, and perform one or more actions based on the hybrid cloud computing environment.

Some implementations described herein relate to a non-transitory computer-readable medium that stores a set of instructions for a device. The set of instructions, when executed by one or more processors of the device, may cause the device to receive application data identifying an application to be executed by a hybrid cloud computing environment, and receive constraint data identifying constraints associated with the hybrid cloud computing environment. The set of instructions, when executed by one or more processors of the device, may cause the device to select objectives for the hybrid cloud computing environment based on the application data and the constraint data, and identify factors associated with the objectives based on the constraint data. The set of instructions, when executed by one or more processors of the device, may cause the device to correlate the factors with potential data centers for the hybrid cloud computing environment, to generate correlated factors, and apply weights to the correlated factors to generate correlated factor scores. The set of instructions, when executed by one or more processors of the device, may cause the device to identify a list of data centers based on the correlated factor scores, and determine a reduced list of data centers based on the list of data centers and the constraint data. The set of instructions, when executed by one or more processors of the device, may cause the device to apply a technique for order of preference by similarity to ideal solution (TOPSIS) model to the reduced list of data centers to generate a ranked list of data centers, and determine the hybrid cloud computing environment based on the ranked list of data centers. The set of instructions, when executed by one or more processors of the device, may cause the device to perform one or more actions based on the hybrid cloud computing environment.

BRIEF DESCRIPTION OF THE DRAWINGS

FIGS. 1A-1H are diagrams of an example implementation described herein.

FIG. 2 is a diagram of an example environment in which systems and/or methods described herein may be implemented.

FIG. 3 is a diagram of example components of one or more devices of FIG. 2.

FIG. 4 is a flowchart of an example process for determining a recommended hybrid cloud computing environment for an application on demand.

DETAILED DESCRIPTION

Figure 1A:
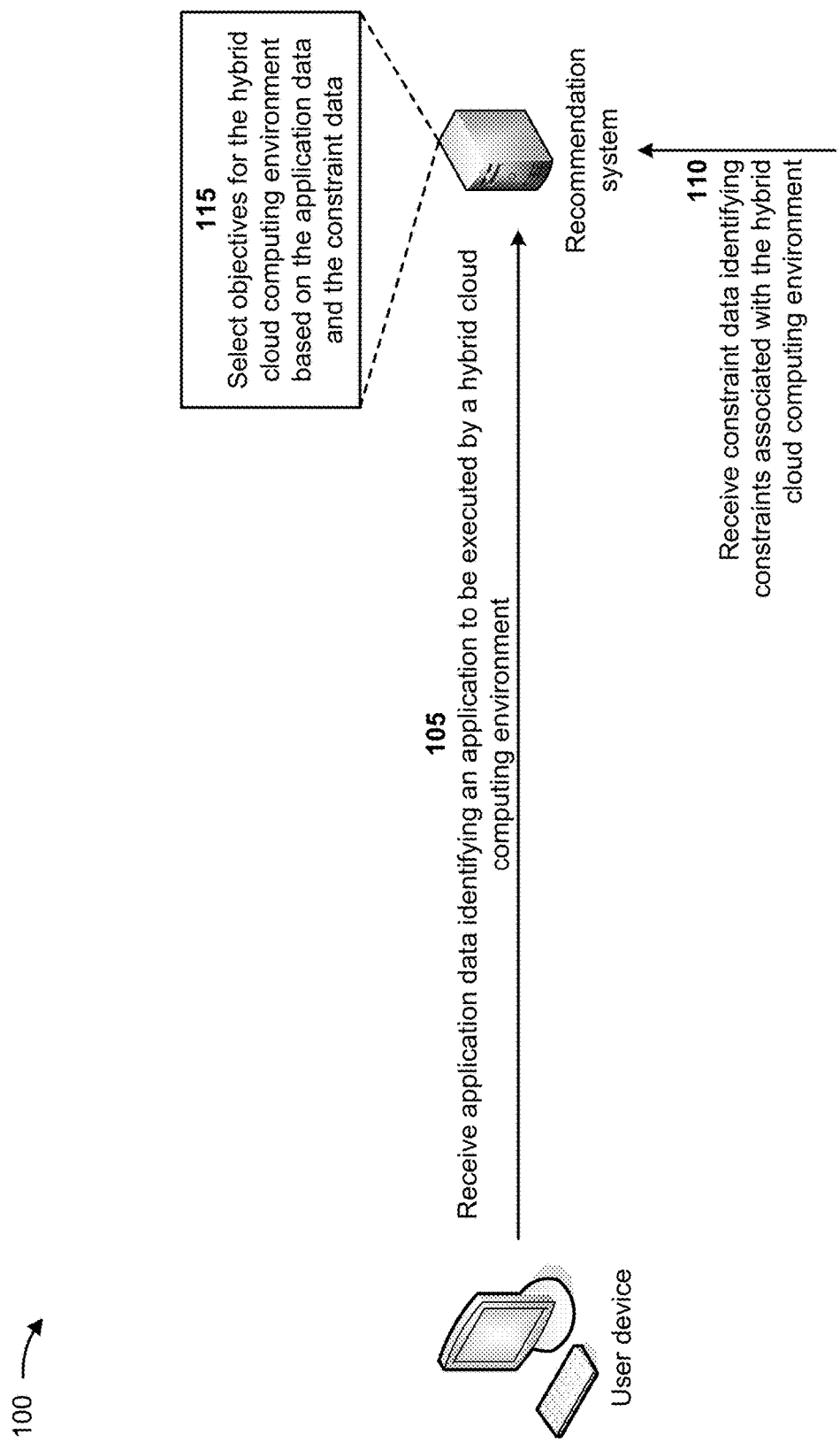

The following detailed description of example implementations refers to the accompanying drawings. The same reference numbers in different drawings may identify the same or similar elements.

In some instances, an application may be migrated from on premise or off premise to a hybrid cloud computing environment. Such a migration may include identifying on premise resources (e.g., data centers of an on premise cloud computing environment) and off premise resources (e.g., data centers of an off premise cloud computing environment) for the hybrid cloud computing environment. A substantial quantity of time and resources may be required for identifying the on premise resources and the off premise resources. Such a migration may also include instantiating the application at the on premise resources and the off premise resources. A substantial quantity of time and resources may be required to instantiate the application, and may result in application disruption for clients of the application. Therefore, current techniques for migrating an application to a hybrid cloud computing environment consume computing resources (e.g., processing resources, memory resources, communication resources, and/or the like), networking resources, and/or the like associated with utilizing resources to identify the on premise resources and the off premise resources for the hybrid cloud computing environment, utilizing resources to instantiate the application in the hybrid cloud computing environment, spending time and money on migration of the application to the hybrid cloud computing environment, and/or the like.

Some implementations described herein relate to a recommendation system that determines a recommended hybrid cloud computing environment for an application on demand. For example, the recommendation system may receive application data identifying an application to be executed by a hybrid cloud computing environment, and may receive constraint data identifying constraints associated with the hybrid cloud computing environment. The recommendation system may select objectives for the hybrid cloud computing environment based on the application data and the constraint data, and may identify factors associated with the objectives based on the constraint data. The recommendation system may correlate the factors with potential data centers for the hybrid cloud computing environment, to generate correlated factors, and may apply weights to the correlated factors to generate correlated factor scores. The recommendation system may identify a list of data centers based on the correlated factor scores, and may determine a reduced list of data centers based on the list of data centers and the constraint data. The recommendation system may apply a preference technique to the reduced list of data centers to generate a ranked list of data centers, and may determine the hybrid cloud computing environment based on the ranked list of data centers. The recommendation system may perform one or more actions based on the hybrid cloud computing environment.

In this way, the recommendation system determines a recommended hybrid cloud computing environment for an application on demand. The recommendation system may recommend a hybrid cloud computing environment for an application. The recommendation system may dynamically optimize the recommended hybrid cloud computing environment for multiple objectives based on constraints, such as computation requirements, storage requirements, sustainability of cloud data centers, privacy requirements, regulatory requirements in terms of data handling (e.g., storage and processing), environmental requirements, expectations of processing latency, preferred locations, a preferred cloud service provider (e.g., a vendor), requirements entailing different components of the application to reside and function on different components of the hybrid cloud computing environment at different points of time, requirements for live movement of one or more components of the application at one or more points of time within its execution lifecycle, and/or the like. The recommendation system may recommend the hybrid cloud computing environment and instantiate the application in the hybrid cloud computing environment based the constraints and on demand without disrupting operation of the application. This, in turn, conserves computing resources, networking resources, and/or the like that would otherwise have been consumed in utilizing resources to identify the on premise resources and the off premise resources for the hybrid cloud computing environment, utilizing resources to instantiate the application in the hybrid cloud computing environment, spending time and money on migration of the application to the hybrid cloud computing environment, and/or the like.

FIGS. 1A-1H are diagrams of an example 100 associated with determining a recommended hybrid cloud computing environment for an application on demand. As shown in FIGS. 1A-1H, example 100 includes a recommendation system associated with a user device. The recommendation system may include a system that determines a recommended hybrid cloud computing environment for an application on demand. Further details of the recommendation system and the user device are provided elsewhere herein.

As shown in FIG. 1A, and by reference number 105, the recommendation system may receive application data identifying an application to be executed by a hybrid cloud computing environment. For example, a user of the user device (e.g., a client) may utilize an application that is currently being provided by on premise resources (e.g., on premise server devices and/or an on premise cloud computing environment) or by off premise resources (e.g., an off premise cloud computing environment). The user may wish to migrate the application to the hybrid cloud computing environment (e.g., a combination of an on premise cloud computing environment and an off premise cloud computing environment) while the application is executing and without disrupting execution of the application by the client. The user may cause the user device to provide, to the recommendation system, the application data identifying the application to be executed by the hybrid cloud computing environment, and the recommendation system may receive the application data. In some implementations, the application data may include data identifying data fields with sensitive data types of the application, data fields of the application to be stored on premise, data fields of the application to be stored off premise, geographical locations of users of the application, privacy requirements of the application, storage requirements of the application, processing requirements of the application, and/or the like.

As further shown in FIG. 1A, and by reference number 110, the recommendation system may receive constraint data identifying constraints associated with the hybrid cloud computing environment. For example, the user may utilize the user device to provide the constraint data associated with the client and/or the application to the recommendation system, and the recommendation system may receive the constraint data from the user device. Alternatively, or additionally, other sources (e.g., regulatory agencies, cloud service providers, and/or the like) may provide the constraint data to the recommendation system, and the recommendation system may receive the constraint data from the other sources.

In some implementations, the constraint data may include data identifying computation requirements for the hybrid cloud computing environment, storage requirements for the hybrid cloud computing environment, sustainability (e.g., environmental impact) of the potential data centers for the hybrid cloud computing environment, privacy requirements for the hybrid cloud computing environment, regulatory requirements for the hybrid cloud computing environment, environmental requirements for the hybrid cloud computing environment, expectations of processing latency for the hybrid cloud computing environment, geographical locations of the potential data centers for the hybrid cloud computing environment, a cloud service provider for the hybrid cloud computing environment, requirements entailing different components of the application to reside and function on different components of the hybrid cloud computing environment at different points of time, requirements for live movement of one or more components of the application at one or more points of time within an execution lifecycle, and/or the like.

As further shown in FIG. 1A, and by reference number 115, the recommendation system may select objectives for the hybrid cloud computing environment based on the application data and the constraint data. For example, the recommendation system may analyze the application data and the constraint data to determine sovereignty impacts on locations of the hybrid cloud computing environment, privacy impacts on resources provided on premise and off premise for the hybrid cloud computing environment, sustainability impacts on environmental aspects of the hybrid cloud computing environment, and/or the like. The recommendation system may determine drivers associated with the sovereignty impacts, the privacy impacts, the sustainability impacts, and/or the like. For example, the recommendation system may determine that regulations generated by government agencies is a driver for the sovereignty impacts, that a client's choice of data processing and/or storage is a driver for the privacy impacts, that the regulations and a client's choice of environmentally friendly levels to attain are drivers for the sustainability impacts, and/or the like.

The recommendation system may select the objectives for the hybrid cloud computing environment based on the drivers associated with the sovereignty impacts, the privacy impacts, the sustainability impacts, and/or the like. For example, the recommendation system may select a residency objective (e.g., a geolocation where data is permitted to be stored for a particular duration), a processing objective (e.g., a geolocation where data is to be lawfully processed), a proof objective (e.g., certificates of compliance), and/or the like for the sovereignty impacts. The recommendation system may select a storage objective (e.g., on premise or off premise data storage for a particular duration), a processing objective (e.g., on premise or off premise data processing and processing environments), a private data objective (e.g., whether private data can be shared with a cloud environment), a flexibility objective (e.g., whether privacy is rigid), and/or the like for the privacy impacts. The recommendation system may select a mandate objective (e.g., whether there are any mandates of infrastructural sustainability to be satisfied), a carbon incentive objective (e.g., credit incentives for client's environmental policies), and/or the like for the sustainability impacts.

In some implementations, the recommendation system may select, as the objectives, regulations and policies associated with the hybrid cloud computing environment, sustainability of the potential data centers for the hybrid cloud computing environment, a cost associated with the hybrid cloud computing environment, interoperability of the potential data centers for the hybrid cloud computing environment, privacy requirements for the hybrid cloud computing environment, and/or the like.

As shown in FIG. 1B, and by reference number 120, the recommendation system may identify factors associated with the objectives based on the constraint data. For example, the recommendation system may analyze the objectives and the constraint data, and may identify the factors based on analyzing the objectives and the constraint data. In some implementations, the recommendation system may identify, as the factors, sensitivity of data fields associated with the application, the client's choice of privacy for application data, a geolocation of a data source of the application, a cloud service provider's compliance with regulations, a cloud service provider's privacy enhancing technologies, a geolocations of data centers, sustainability of data centers, preferences of the client, and/or the like. The sensitivity of data fields factor may identify data fields associated with sensitive data types based on knowledge bases and the client's preferences. The client's choice of privacy factor may identify data fields (e.g., sensitive and non-sensitive) that the client wishes to be stored and processed on premise and data fields that can be stored and processed off premise. The geolocation of the data source factor may identify a geolocation from where data is generated and what regulatory mandates are for storage and processing at the geolocation. The cloud service provider's compliance with regulations factor may identify regulations complied with by the cloud service provider. The cloud service provider's privacy enhancing technologies factor may identify privacy enhancing technologies provided by the cloud service provider (e.g., homomorphic encryption, trusted execution environment (TEE), and/or the like). The geolocations of data centers factor may identify geolocations of data centers for different cloud service providers. The sustainability of data centers factor may identify sustainability scores of data centers for different cloud service providers. The preferences of the client factor may identify values of preferences and priorities that the client assigns to privacy as a whole, privacy of each data field, and sustainability.

In some implementations, the recommendation system may identify, as the factors, geographical locations of the potential data centers for the hybrid cloud computing environment, a cloud service provider for the hybrid cloud computing environment, a service provided by the cloud service provider for the hybrid cloud computing environment, costs associated with the potential data centers for the hybrid cloud computing environment, privacy requirements for the hybrid cloud computing environment, and/or the like.

Figure 1C:
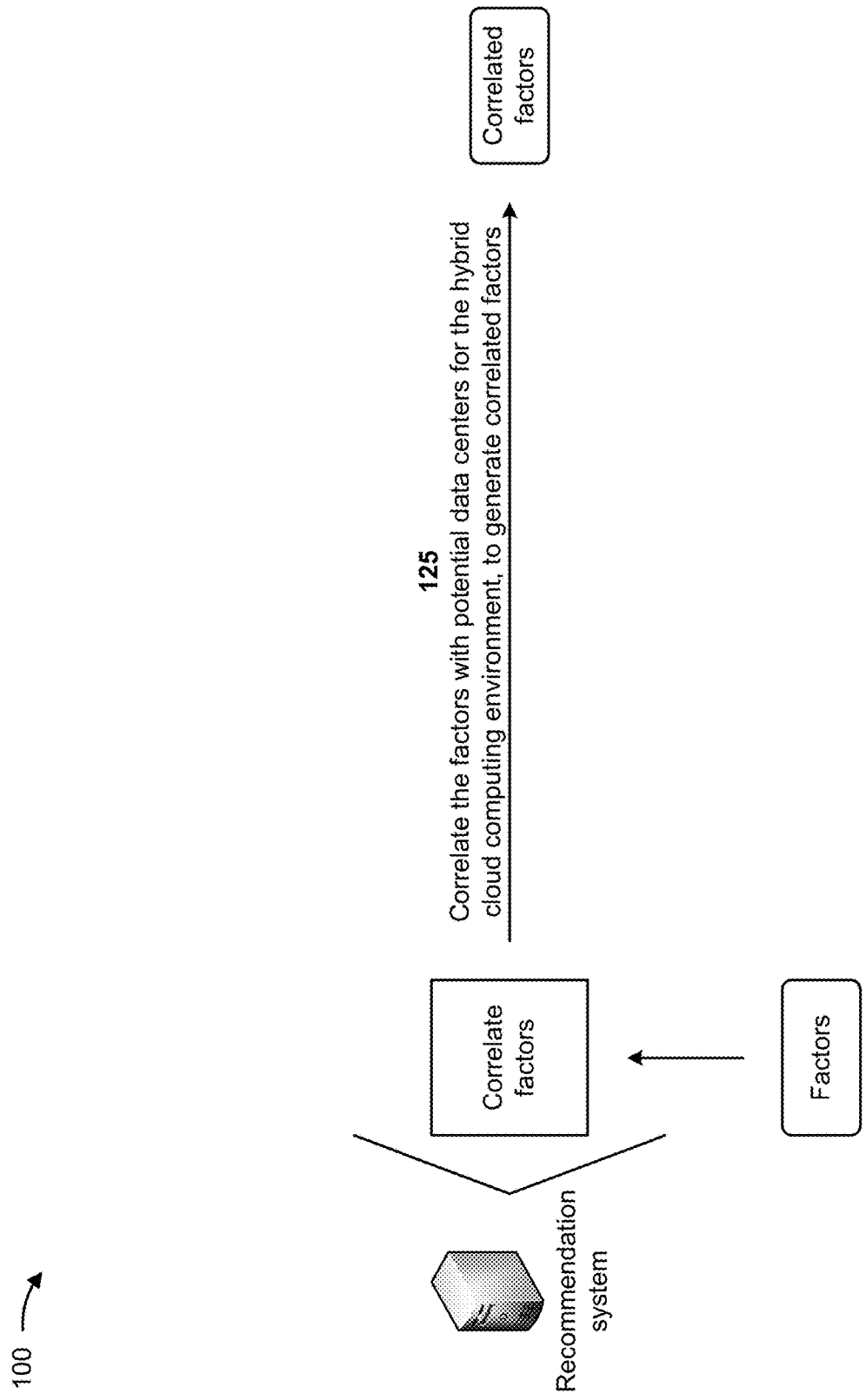

As shown in FIG. 1C, and by reference number 125, the recommendation system may correlate the factors with potential data centers for the hybrid cloud computing environment to generate correlated factors. For example, the recommendation system may identify, as the potential data centers, data centers of different cloud service providers that may potentially be utilized for the hybrid cloud computing environment. In some implementations, the recommendation system may correlate the factors with geographical locations of the potential data centers for the hybrid cloud computing environment, cloud service providers for the hybrid cloud computing environment, services provided by the cloud service providers for the hybrid cloud computing environment, costs associated with the potential data centers for the hybrid cloud computing environment, privacy requirements for the hybrid cloud computing environment, and/or the like.

Figure 1D:
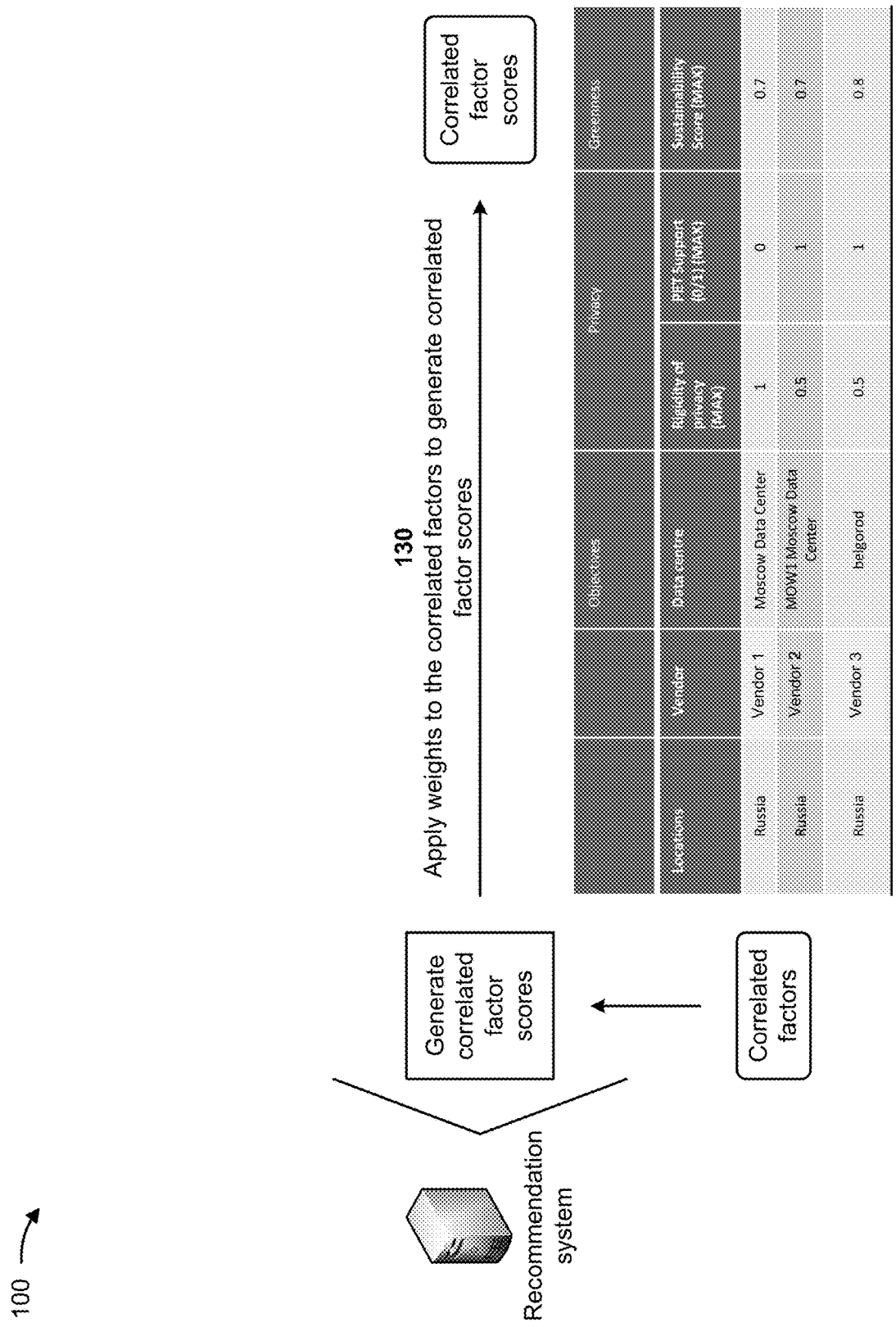

As shown in FIG. 1D, and by reference number 130, the recommendation system may apply weights to the correlated factors to generate correlated factor scores. For example, when applying the weights to the correlated factors to generate the correlated factor scores, the recommendation system may receive a knowledge base associated with the potential data centers. The knowledge base may include information identifying capabilities of the potential data centers, such as processing capabilities of the potential data centers, storage capabilities of the potential data centers, sustainability of the potential data centers, privacy technologies supported by the potential data centers, and/or the like. The recommendation system may receive user data identifying users of the application. The user data may include data identifying the users of the application, geolocations of the users, processing requirements of the users, storage requirements of the users, and/or the like. The recommendation system may receive miscellaneous data identifying tools for the hybrid cloud computing environment and processes to perform by the hybrid cloud computing environment. For example, the miscellaneous data may include data identifying outputs generated by the tools for the potential data centers (e.g., sustainability scores for the potential data centers, privacy scores for the potential data centers, and/or the like); data identifying processing to be performed by the potential data centers for the application; data identifying storage to be performed by the potential data centers for the application; and/or the like. The recommendation system may determine the weights based on the knowledge base, the user data, and the miscellaneous data, and may apply the weights, determined based on the knowledge base, the user data, and the miscellaneous data, to the correlated factors to generate the correlated factor scores.

In some implementations, when determining the weights to apply to the factors, the recommendation system may determine the weights based on various conflicts between the application data, the constraint data, and the correlated factors. For example, the recommendation system may determine the weights based on whether environmentally friendly potential data centers for storage and processing comply with regulatory residency (e.g., for storage and processing) requirements; whether environmentally friendly potential data centers for storage and processing provide sufficient support for privacy enhancing technologies required by the client; whether the client's on premise resources support processing a volume of data, but the client needs to process more data and can share only portions of the data with third parties (e.g., an off premise cloud computing environment); whether a cloud service provider advertises only a greenest data center whereas other data centers of the cloud service provider are not as environmentally friendly; whether a greenest data center is located at a residency-forbidden location, while some less green data center complies with residency regulations; and/or the like.

As an example, and as shown in FIG. 1D, the recommendation system may determine locations for data centers (e.g., Russia), vendors of the data centers (e.g., vendor 1, vendor 2, and vendor 3), data center names (e.g., Moscow data center, MOW1 Moscow data center, and Belgorod data center), rigidity of privacy scores (e.g., 1, 0.5, and 0.5), privacy enhancing technology (PET) support scores (e.g., 0, 1, and 1), and sustainability scores (e.g., 0.7, 0.7, and 0.8). The scores may correspond to the correlated factor scores associated with factors, such as locations of the data centers, vendors of the data centers, and/or the like.

Figure 1E:
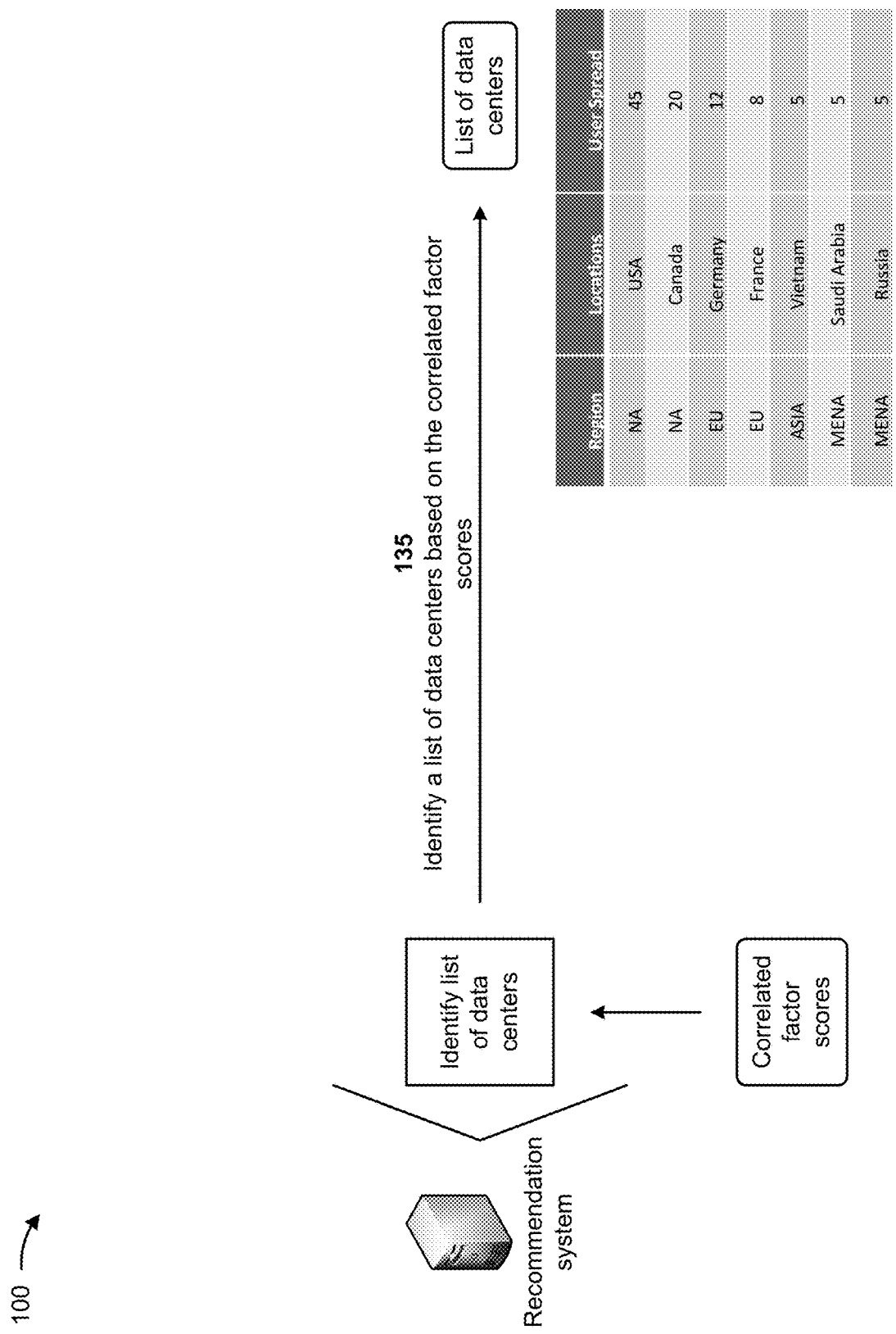

As shown in FIG. 1E, and by reference number 135, the recommendation system may identify a list of data centers based on the correlated factor scores. For example, when identifying the list of data centers based on the correlated factor scores, the recommendation system may rank the potential data centers based on the correlated factor scores. In some implementations, the recommendation system may rank a potential data center, associated with a greatest correlated factor score, first; may rank a potential data center, associated with a next greatest correlated factor score, second; and/or the like. In some implementations, the recommendation system may set a score threshold for the potential data centers to include in the list of data centers, and may select a quantity of data centers, from the potential data centers and for the list of data centers, associated with correlated factor scores that satisfy the score threshold. For example, if the score threshold is greater than 0.5 (e.g., on a scale of 0.0 to 1.0), the recommendation system may select data centers, from the potential data centers and for the list of data centers, associated with correlated factor scores greater than 0.5.

Alternatively, the recommendation system may set a quantity threshold for the potential data centers to include in the list of data centers, and may select the quantity of data centers, from the potential data centers and for the list of data centers, that satisfy the quantity threshold. For example, if there are one-hundred (100) potential data centers and the quantity threshold is set at twenty-five (25), the recommendation system may select the top twenty-five ranked potential centers (e.g., ranked based on the correlated factor scores) for the list of data centers. The recommendation system may not consider the seventy-five (75) unselected potential data centers for the hybrid cloud computing environment.

As an example, and as shown in FIG. 1E, the recommendation system may generate of list of data centers that identifies regions associated with the data centers (e.g., North America (NA), European Union (EU), Asia, the Middle East, and/or the like), locations of the data centers (e.g., USA, Canada, Germany, France, Vietnam, Saudi Arabia, Russia, and/or the like), and a user spread associated with the data centers (e.g., 45, 20, 12, 8, 5, 5, 5, and/or the like).

Figure 1F:
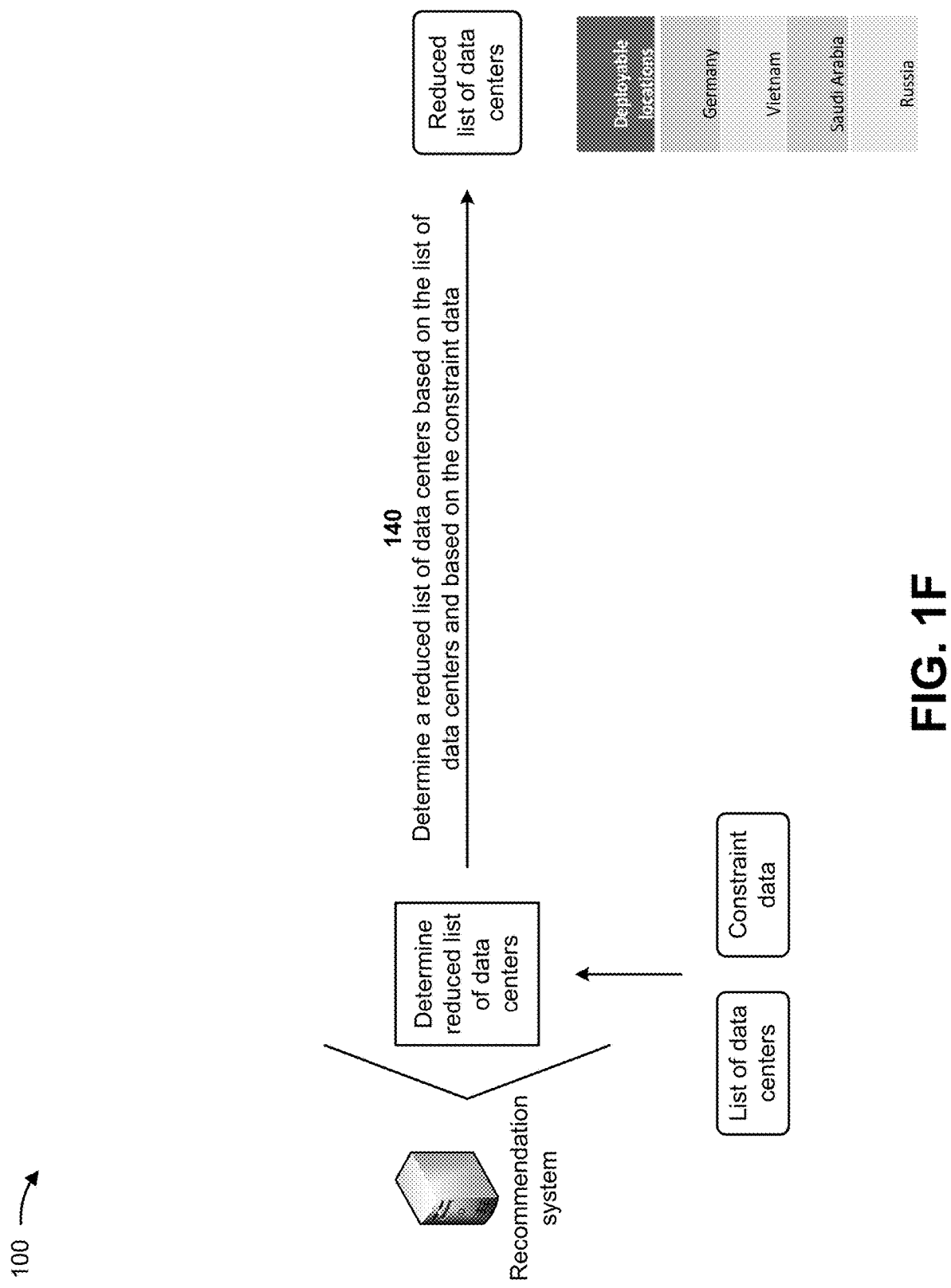

As shown in FIG. 1F, and by reference number 140, the recommendation system may determine a reduced list of data centers based on the list of data centers and the constraint data. For example, the list of data centers may include data identifying the potential data centers that may be viable for the application. The recommendation system may apply the constraint data to the list of data centers to eliminate potential data centers from the list of data centers and to generate the reduced list of data centers. In some implementations, the recommendation system may calculate sustainability scores for data centers provided in the list of data centers, and may remove data centers, from the list of data centers, that fail to satisfy a sustainability score threshold. Removal of the data centers from the list of data centers may generate the reduced list of data centers.

In some implementations, the recommendation system may analyze computation policies of the data centers included in the list of data centers, policies of the client for the application, requirements of geolocations where application data can be stored and/or processed, and/or the like to filter the list of data centers and to generate the reduced list of data centers. In some implementations, the recommendation system may calculate a score for each data field of the application based on a privacy preference for the data field, a rigidity of the privacy preference, privacy support provided by data centers in the list of data centers, sustainability scores of the data centers, the client's weight for sustainability, and/or the like. The recommendation system may utilize the scores for the data fields of the application to filter the list of data centers and to generate the reduced list of data centers. In some implementations, when determining the reduced list of data centers based on the list of data centers and the constraint data, the recommendation system may identify, in the list of data centers, a set of data centers associated with geographical locations that fail to satisfy a distance threshold from locations of users of the application, and may remove the set of data centers from the list of data centers to generate the reduced list of data centers.

As an example, and as shown in FIG. 1F, the recommendation system may determine a reduced list of data centers that includes a list of deployable locations of the data centers (e.g., Germany, Vietnam, Saudi Arabia, and Russia). Thus, the reduced list of data centers may not include the data centers located in the USA, Canada, and France, as shown above in FIG. 1E.

Figure 1G:
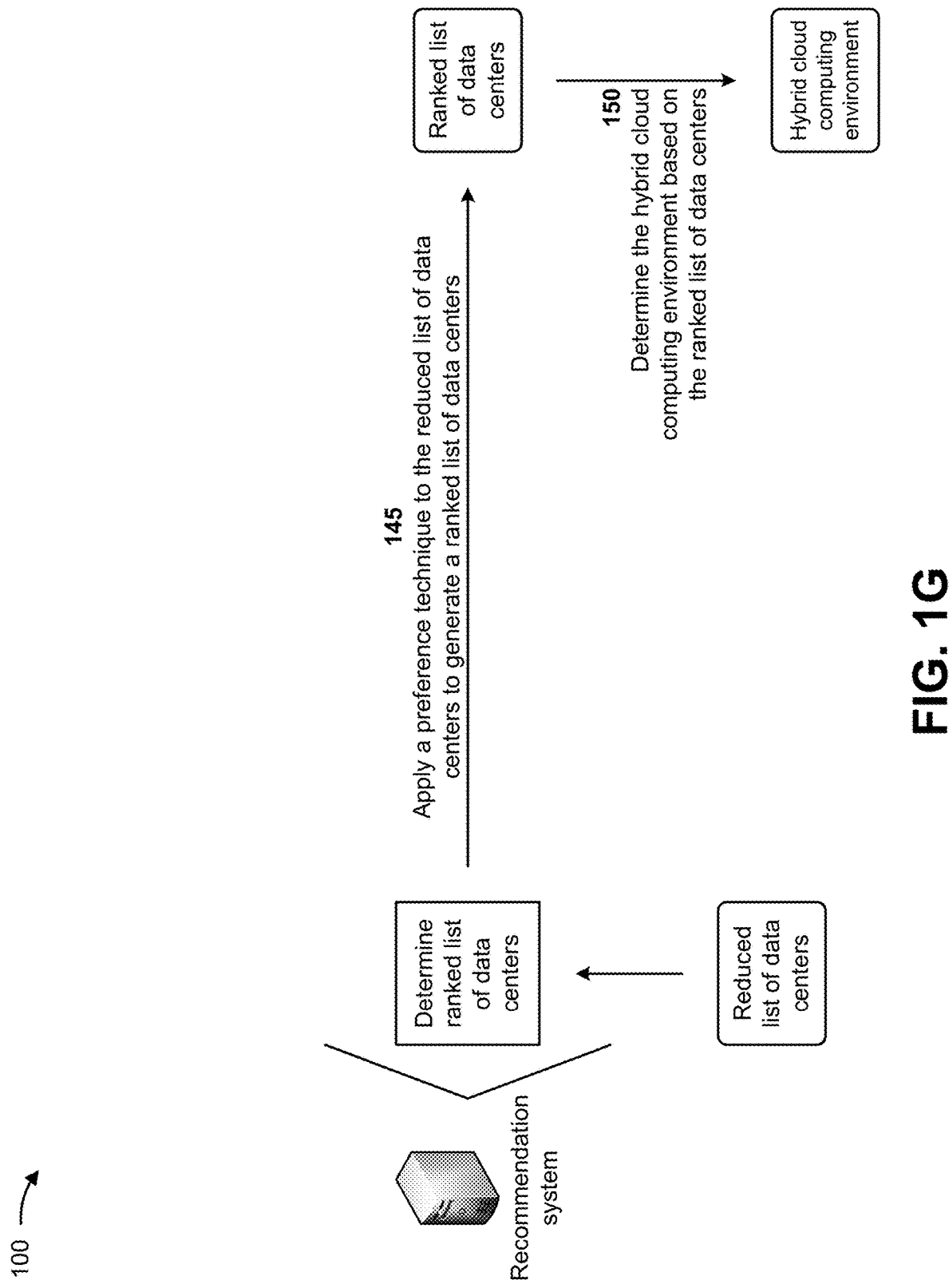

As shown in FIG. 1G, and by reference number 145, the recommendation system may apply a preference technique to the reduced list of data centers to generate a ranked list of data centers. For example, the recommendation system may process the reduced list of data centers, with the preference technique model (e.g., a technique for order of preference by similarity to ideal solution (TOPSIS) model), to generate the ranked list of data centers. TOPSIS is a method of compensatory aggregation that compares a set of alternatives by identifying weights for each criterion, normalizing scores for each criterion, and calculating a geometric distance between each alternative and an ideal alternative, which is a best score in each criterion. In some implementations, when applying the preference technique to the reduced list of data centers to generate the ranked list of data centers, the recommendation system may generate a performance matrix for the reduced list of data centers, and may normalize a decision matrix to generate a normalized decision matrix. The recommendation system may calculate a weighted normalized decision matrix based on the normalized decision matrix, and may determine positive ideal solutions and negative ideal solutions based on the performance matrix and the normalized decision matrix. The recommendation system may calculate separation measures based on the positive ideal solutions and the negative ideal solutions, and may calculate a relative closeness to an ideal solution based on the separation measures. The recommendation system may generate the ranked list of data centers based on the relative closeness.

As further shown in FIG. 1G, and by reference number 150, the recommendation system may determine the hybrid cloud computing environment based on the ranked list of data centers. For example, the recommendation system may select one or more data centers from the ranked list of data centers to utilize for the hybrid cloud computing environment. In some implementations, the recommendation system may select a top ranked (e.g., a top five percent, ten percent, twenty percent, and/or the like) quantity of data centers from the ranked list of data centers to utilize for the hybrid cloud computing environment. In some implementations, the recommendation system may select all of the data centers from the ranked list of data centers to utilize for the hybrid cloud computing environment.

Figure 1H:
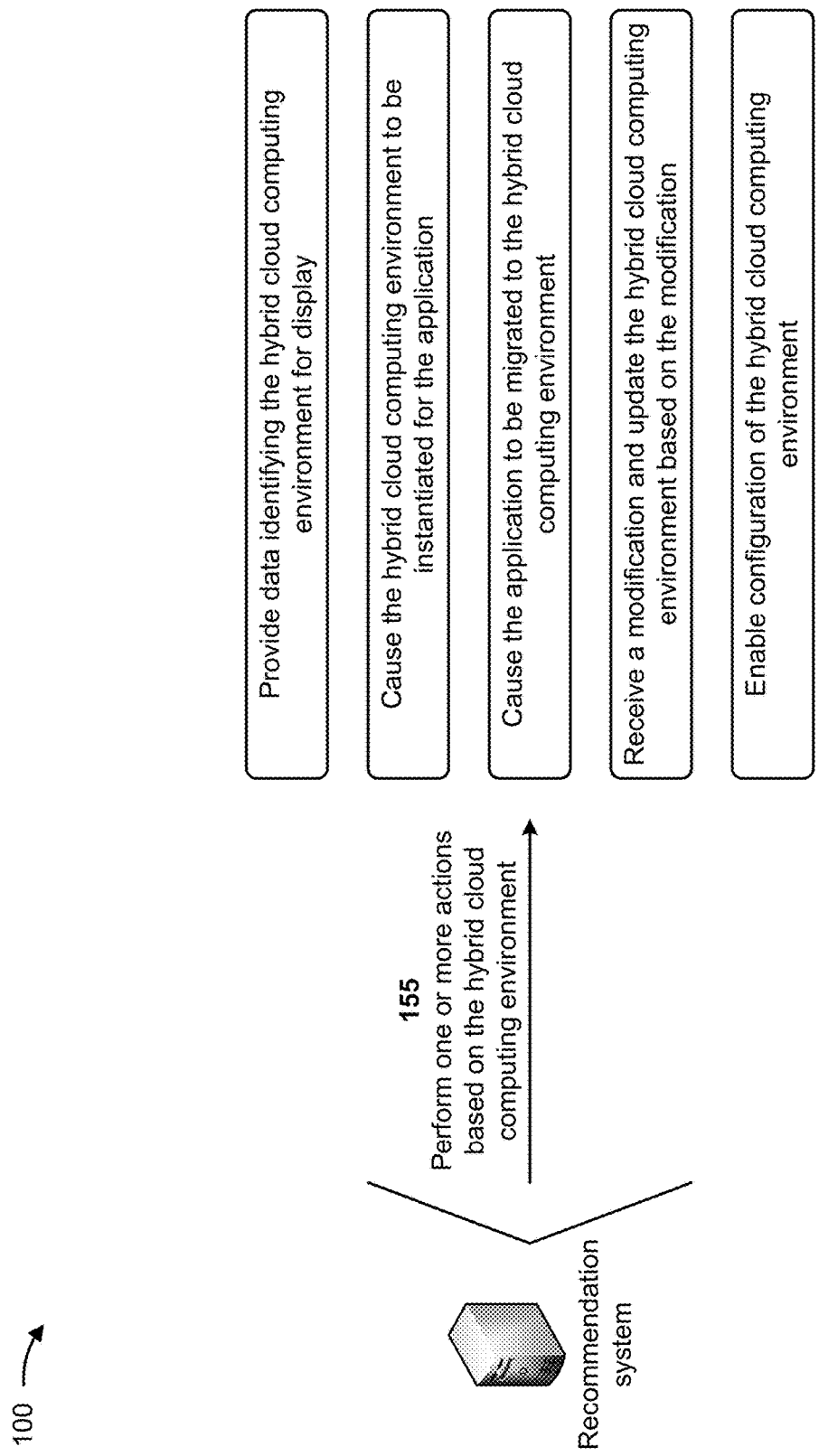

As shown in FIG. 1H, and by reference number 155, the recommendation system may perform one or more actions based on the hybrid cloud computing environment. In some implementations, performing the one or more actions includes the recommendation system providing data identifying the hybrid cloud computing environment for display. For example, the recommendation system may provide the data identifying the hybrid cloud computing environment to the user device, and the user device may display the data identifying the hybrid cloud computing environment to a user of the user device. The user may then view and/or modify the hybrid cloud computing environment. In this way, the recommendation system conserves computing resources, networking resources, and/or the like that would otherwise have been consumed in utilizing resources to identify the on premise resources and the off premise resources for the hybrid cloud computing environment.

In some implementations, performing the one or more actions includes the recommendation system causing the hybrid cloud computing environment to be instantiated for the application. For example, the recommendation system may provide the application data to the data centers identified for the hybrid cloud computing environment. The data centers may instantiate the application based on the application data and may bring the application online without service disruption of the application. In this way, the recommendation system conserves computing resources, networking resources, and/or the like that would otherwise have been consumed in utilizing resources to instantiate the application in the hybrid cloud computing environment.

In some implementations, performing the one or more actions includes the recommendation system causing the application to be migrated to the hybrid cloud computing environment. For example, the recommendation system may provide the application data to the data centers identified for the hybrid cloud computing environment. The data centers may receive the application data from the recommendation system and utilize the application data to bring the application online without service disruption of the application. In this way, the recommendation system conserves computing resources, networking resources, and/or the like that would otherwise have been consumed in spending time and money on migration of the application to the hybrid cloud computing environment.

In some implementations, performing the one or more actions includes the recommendation system receiving a modification and updating the hybrid cloud computing environment based on the modification. For example, the recommendation system may provide the data identifying the hybrid cloud computing environment to the user device, and the user device may display the data identifying the hybrid cloud computing environment to a user of the user device. The user may utilize the user device to generate a modification to the hybrid cloud computing environment via the user device, and the user device may provide the modification to the recommendation system. The recommendation system may receive the modification and may update the hybrid cloud computing environment based on the modification. In this way, the recommendation system conserves computing resources, networking resources, and/or the like that would otherwise have been consumed in utilizing resources to identify the on premise resources and the off premise resources for the hybrid cloud computing environment.

In some implementations, performing the one or more actions includes the recommendation system enabling configuration of the hybrid cloud computing environment. For example, the recommendation system may provide the data identifying the hybrid cloud computing environment to the user device, and the user device may display the data identifying the hybrid cloud computing environment to a user of the user device. The user may utilize the user device to generate configuration data for the hybrid cloud computing environment, and the user device may provide the configuration data to the recommendation system. The recommendation system may receive the configuration data and may configure the hybrid cloud computing environment based on the configuration data. In this way, the recommendation system conserves computing resources, networking resources, and/or the like that would otherwise have been consumed in utilizing resources to instantiate the application in the hybrid cloud computing environment, spending time and money on migration of the application to the hybrid cloud computing environment, and/or the like.

In this way, the recommendation system determines a recommended hybrid cloud computing environment for an application on demand. The recommendation system may recommend a hybrid cloud computing environment for an application. The recommendation system may dynamically optimize the recommended hybrid cloud computing environment for multiple objectives based on constraints, such as computation requirements, storage requirements, sustainability of cloud data centers, privacy requirements, regulatory requirements in terms of data handling, environmental requirements, expectations of processing latency, preferred locations, a preferred cloud service provider, requirements entailing different components of the application to reside and function on different components of the hybrid cloud computing environment at different points of time, requirements for live movement of one or more components of the application at one or more points of time within its execution lifecycle, and/or the like. The recommendation system may recommend the hybrid cloud computing environment and instantiate the application in the hybrid cloud computing environment based the constraints and on demand without disrupting operation of the application. This, in turn, conserves computing resources, networking resources, and/or the like that would otherwise have been consumed in utilizing resources to identify the on premise resources and the off premise resources for the hybrid cloud computing environment, utilizing resources to instantiate the application in the hybrid cloud computing environment, spending time and money on migration of the application to the hybrid cloud computing environment, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

FIG. 2 is a diagram of an example environment 200 in which systems and/or methods described herein may be implemented. As shown in FIG. 2, the environment 200 may include a recommendation system 201, which may include one or more elements of and/or may execute within a cloud computing system 202. The cloud computing system 202 may include one or more elements 203-213, as described in more detail below. As further shown in FIG. 2, the environment 200 may include a network 220 and/or a user device 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the recommendation system 201 may include one or more elements 203-213 of the cloud computing system 202, may execute within the cloud computing system 202, and/or may be hosted within the cloud computing system 202, in some implementations, the recommendation system 201 may not be cloud-based (e.g., may be implemented outside of a cloud computing system) or may be partially cloud-based. For example, the recommendation system 201 may include one or more devices that are not part of the cloud computing system 202, such as device 300 of FIG. 3, which may include a standalone server or another type of computing device. The recommendation system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The user device 230 includes one or more devices capable of receiving, generating, storing, processing, and/or providing information, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

FIG. 3 is a diagram of example components of a device 300, which may correspond to the recommendation system 201 and/or the user device 230. In some implementations, the recommendation system 201 and/or the user device 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The input component 340 enables the device 300 to receive input, such as user input and/or sensed inputs. For example, the input component 340 may include a touch screen, a keyboard, a keypad, a mouse, a button, a microphone, a switch, a sensor, a global positioning system component, an accelerometer, a gyroscope, an actuator, and/or the like. The output component 350 enables the device 300 to provide output, such as via a display, a speaker, and/or one or more light-emitting diodes. The communication component 360 enables the device 300 to communicate with other devices, such as via a wired connection and/or a wireless connection. For example, the communication component 360 may include a receiver, a transmitter, a transceiver, a modem, a network interface card, an antenna, and/or the like.

The device 300 may perform one or more processes described herein. For example, a non-transitory computer-readable medium (e.g., the memory 330) may store a set of instructions (e.g., one or more instructions, code, software code, program code, and/or the like) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for determining a recommended hybrid cloud computing environment for an application on demand. In some implementations, one or more process blocks of FIG. 4 may be performed by a device (e.g., the recommendation system 201). In some implementations, one or more process blocks of FIG. 4 may be performed by another device or a group of devices separate from or including the device, such as a user device (e.g., the user device 230). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving application data identifying an application to be executed by a hybrid cloud computing environment (block 405). For example, the device may receive application data identifying an application to be executed by a hybrid cloud computing environment, as described above. In some implementations, the application data includes data identifying one or more of data fields with sensitive data types, data fields to be stored on premise, data fields to be stored off premise, or geographical locations of users of the application.

As further shown in FIG. 4, process 400 may include receiving constraint data identifying constraints associated with the hybrid cloud computing environment (block 410). For example, the device may receive constraint data identifying constraints associated with the hybrid cloud computing environment, as described above. In some implementations, the constraint data includes data identifying one or more of computation requirements for the hybrid cloud computing environment, storage requirements for the hybrid cloud computing environment, sustainability of the potential data centers for the hybrid cloud computing environment, privacy requirements for the hybrid cloud computing environment, regulatory requirements for the hybrid cloud computing environment, environmental requirements for the hybrid cloud computing environment, expectations of processing latency for the hybrid cloud computing environment, geographical locations of the potential data centers for the hybrid cloud computing environment, a cloud service provider for the hybrid cloud computing environment, requirements entailing different components of the application to reside and function on different components of the hybrid cloud computing environment at different points of time, or requirements for live movement of one or more components of the application at one or more points of time within an execution lifecycle.

As further shown in FIG. 4, process 400 may include selecting objectives for the hybrid cloud computing environment based on the application data and the constraint data (block 415). For example, the device may select objectives for the hybrid cloud computing environment based on the application data and the constraint data, as described above. In some implementations, selecting the objectives for the hybrid cloud computing environment based on the application data and the constraint data includes selecting, as the objectives, one or more of regulations and policies associated with the hybrid cloud computing environment, sustainability of the potential data centers for the hybrid cloud computing environment, a cost associated with the hybrid cloud computing environment, interoperability of the potential data centers for the hybrid cloud computing environment, or privacy requirements for the hybrid cloud computing environment.

As further shown in FIG. 4, process 400 may include identifying factors associated with the objectives based on the constraint data (block 420). For example, the device may identify factors associated with the objectives based on the constraint data, as described above. In some implementations, identifying the factors associated with the objectives based on the constraint data includes identifying, as the factors, one or more of geographical locations of the potential data centers for the hybrid cloud computing environment, a cloud service provider for the hybrid cloud computing environment, a service provided by the cloud service provider for the hybrid cloud computing environment, costs associated with the potential data centers for the hybrid cloud computing environment, or privacy requirements for the hybrid cloud computing environment.

As further shown in FIG. 4, process 400 may include correlating the factors with potential data centers for the hybrid cloud computing environment, to generate correlated factors (block 425). For example, the device may correlate the factors with potential data centers for the hybrid cloud computing environment, to generate correlated factors, as described above.

As further shown in FIG. 4, process 400 may include applying weights to the correlated factors to generate correlated factor scores (block 430). For example, the device may apply weights to the correlated factors to generate correlated factor scores, as described above. In some implementations, applying the weights to the correlated factors to generate the correlated factor scores includes receiving a knowledge base associated with the potential data centers, receiving user data identifying users of the application, receiving miscellaneous data identifying tools for the hybrid cloud computing environment and processes to perform by the hybrid cloud computing environment, determining the weights based on the knowledge base, the user data, and the miscellaneous data, and applying the weights, determined based on the knowledge base, the user data, and the miscellaneous data, to the correlated factors to generate the correlated factor scores.

As further shown in FIG. 4, process 400 may include identifying a list of data centers based on the correlated factor scores (block 435). For example, the device may identify a list of data centers based on the correlated factor scores, as described above. In some implementations, identifying the list of data centers based on the correlated factor scores includes ranking the potential data centers based on the correlated factor scores, and selecting a quantity of data centers, from the potential data centers and for the list of data centers, associated with correlated factor scores that satisfy a score threshold.

As further shown in FIG. 4, process 400 may include determining a reduced list of data centers based on the list of data centers and the constraint data (block 440). For example, the device may determine a reduced list of data centers based on the list of data centers and the constraint data, as described above. In some implementations, determining the reduced list of data centers based on the list of data centers and the constraint data includes identifying, in the list of data centers, a set of data centers associated with geographical locations that fail to satisfy a distance threshold from locations of users of the application, and removing the set of data centers from the list of data centers to generate the reduced list of data centers.

As further shown in FIG. 4, process 400 may include applying a preference technique to the reduced list of data centers to generate a ranked list of data centers (block 445). For example, the device may apply a preference technique to the reduced list of data centers to generate a ranked list of data centers, as described above. In some implementations, the preference technique is a technique for order of preference by similarity to ideal solution. In some implementations, applying the preference technique to the reduced list of data centers to generate the ranked list of data centers includes generating a performance matrix for the reduced list of data centers, normalizing a decision matrix to generate a normalized decision matrix, calculating a weighted normalized decision matrix based on the normalized decision matrix, determining positive ideal solutions and negative ideal solutions based on the performance matrix and the normalized decision matrix, calculating separation measures based on the positive ideal solutions and the negative ideal solutions, calculating a relative closeness to an ideal solution based on the separation measures, and generating the ranked list of data centers based on the relative closeness.

As further shown in FIG. 4, process 400 may include determining the hybrid cloud computing environment based on the ranked list of data centers (block 450). For example, the device may determine the hybrid cloud computing environment based on the ranked list of data centers, as described above.

As further shown in FIG. 4, process 400 may include performing one or more actions based on the hybrid cloud computing environment (block 455). For example, the device may perform one or more actions based on the hybrid cloud computing environment, as described above. In some implementations, performing the one or more actions includes one or more of providing data identifying the hybrid cloud computing environment for display, or causing the hybrid cloud computing environment to be instantiated for the application. In some implementations, performing the one or more actions includes one or more of causing the application to be migrated to the hybrid cloud computing environment, or enabling configuration of the hybrid cloud computing environment. In some implementations, performing the one or more actions includes receiving a modification for the hybrid cloud computing environment, and updating the hybrid cloud computing environment based on the modification.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, application data identifying an application to be executed by a hybrid cloud computing environment;
    receiving, by the device, constraint data identifying constraints associated with the hybrid cloud computing environment;
    selecting, by the device, objectives for the hybrid cloud computing environment based on the application data and the constraint data;
    identifying, by the device, factors associated with the objectives based on the constraint data;
    correlating, by the device, the factors with potential data centers for the hybrid cloud computing environment, to generate correlated factors;
    applying, by the device, weights to the correlated factors to generate correlated factor scores;
    identifying, by the device, a list of data centers based on the correlated factor scores;
    determining, by the device, a reduced list of data centers based on the list of data centers and the constraint data;
    applying, by the device, a preference technique to the reduced list of data centers to generate a ranked list of data centers;
    determining, by the device, the hybrid cloud computing environment based on the ranked list of data centers; and
    performing, by the device, one or more actions based on the hybrid cloud computing environment.

2. The method of claim 1, wherein the application data includes data identifying one or more of:
    data fields with sensitive data types,
    data fields to be stored on premise,
    data fields to be stored off premise, or
    geographical locations of users of the application.

3. The method of claim 1, wherein the constraint data includes data identifying one or more of:
    computation requirements for the hybrid cloud computing environment,
    storage requirements for the hybrid cloud computing environment,
    sustainability of the potential data centers for the hybrid cloud computing environment,
    privacy requirements for the hybrid cloud computing environment,
    regulatory requirements for the hybrid cloud computing environment,
    environmental requirements for the hybrid cloud computing environment,
    expectations of processing latency for the hybrid cloud computing environment,
    geographical locations of the potential data centers for the hybrid cloud computing environment,
    a cloud service provider for the hybrid cloud computing environment,
    requirements entailing different components of the application to reside and function on different components of the hybrid cloud computing environment at different points of time, or
    requirements for live movement of one or more components of the application at one or more points of time within an execution lifecycle.

4. The method of claim 1, wherein selecting the objectives for the hybrid cloud computing environment based on the application data and the constraint data comprises:
    selecting, as the objectives, one or more of:
        regulations and policies associated with the hybrid cloud computing environment,
        sustainability of the potential data centers for the hybrid cloud computing environment,
        a cost associated with the hybrid cloud computing environment,
        interoperability of the potential data centers for the hybrid cloud computing environment, or privacy requirements for the hybrid cloud computing environment.

5. The method of claim 1, wherein identifying the factors associated with the objectives based on the constraint data comprises:
identifying, as the factors, one or more of:
geographical locations of the potential data centers for the hybrid cloud computing environment,
a cloud service provider for the hybrid cloud computing environment,
a service provided by the cloud service provider for the hybrid cloud computing environment,
costs associated with the potential data centers for the hybrid cloud computing environment, or
privacy requirements for the hybrid cloud computing environment.

6. The method of claim 1, wherein applying the weights to the correlated factors to generate the correlated factor scores comprises:
receiving a knowledge base associated with the potential data centers;
receiving user data identifying users of the application;
receiving miscellaneous data identifying tools for the hybrid cloud computing environment and processes to perform by the hybrid cloud computing environment;
determining the weights based on the knowledge base, the user data, and the miscellaneous data; and
applying the weights, determined based on the knowledge base, the user data, and the miscellaneous data, to the correlated factors to generate the correlated factor scores.

7. The method of claim 1, wherein identifying the list of data centers based on the correlated factor scores comprises:
ranking the potential data centers based on the correlated factor scores; and
selecting a quantity of data centers, from the potential data centers and for the list of data centers, associated with correlated factor scores that satisfy a score threshold.

8. A device, comprising:
one or more memories; and
one or more processors, coupled to the one or more memories, configured to:
receive application data identifying an application to be executed by a hybrid cloud computing environment;
receive constraint data identifying constraints associated with the hybrid cloud computing environment;
select objectives for the hybrid cloud computing environment based on the application data and the constraint data;
identify correlated factors associated with the objectives based on the constraint data,
wherein the correlated factors are correlated with potential data centers for the hybrid cloud computing environment;
apply weights to the correlated factors to generate correlated factor scores;
identify a list of data centers based on the correlated factor scores;
determine a reduced list of data centers based on the list of data centers and the constraint data;
apply a preference technique to the reduced list of data centers to generate a ranked list of data centers;
determine the hybrid cloud computing environment based on the ranked list of data centers; and
perform one or more actions based on the hybrid cloud computing environment.

9. The device of claim 8, wherein the one or more processors, to determine the reduced list of data centers based on the list of data centers and the constraint data, are configured to:
identify, in the list of data centers, a set of data centers associated with geographical locations that fail to satisfy a distance threshold from locations of users of the application; and
remove the set of data centers from the list of data centers to generate the reduced list of data centers.

10. The device of claim 8, wherein the preference technique is a technique for order of preference by similarity to ideal solution.

11. The device of claim 8, wherein the one or more processors, to apply the preference technique to the reduced list of data centers to generate the ranked list of data centers, are configured to:
generate a performance matrix for the reduced list of data centers;
normalize a decision matrix to generate a normalized decision matrix;
calculate a weighted normalized decision matrix based on the normalized decision matrix;
determine positive ideal solutions and negative ideal solutions based on the performance matrix and the normalized decision matrix;
calculate separation measures based on the positive ideal solutions and the negative ideal solutions;
calculate a relative closeness to an ideal solution based on the separation measures; and
generate the ranked list of data centers based on the relative closeness.

12. The device of claim 8, wherein the one or more processors, to perform the one or more actions, are configured to one or more of:
provide data identifying the hybrid cloud computing environment for display; or
cause the hybrid cloud computing environment to be instantiated for the application.

13. The device of claim 8, wherein the one or more processors, to perform the one or more actions, are configured to one or more of:
cause the application to be migrated to the hybrid cloud computing environment; or
enable configuration of the hybrid cloud computing environment.

14. The device of claim 8, wherein the one or more processors, to perform the one or more actions, are configured to:
receive a modification for the hybrid cloud computing environment; and
update the hybrid cloud computing environment based on the modification.

15. A non-transitory computer-readable medium storing a set of instructions, the set of instructions comprising:
one or more instructions that, when executed by one or more processors of a device, cause the device to:
receive application data identifying an application to be executed by a hybrid cloud computing environment;
receive constraint data identifying constraints associated with the hybrid cloud computing environment;
select objectives for the hybrid cloud computing environment based on the application data and the constraint data;
identify factors associated with the objectives based on the constraint data;

correlate the factors with potential data centers for the hybrid cloud computing environment, to generate correlated factors;

apply weights to the correlated factors to generate correlated factor scores;

identify a list of data centers based on the correlated factor scores;

determine a reduced list of data centers based on the list of data centers and the constraint data;

apply a technique for order of preference by similarity to ideal solution (TOPSIS) model to the reduced list of data centers to generate a ranked list of data centers;

determine the hybrid cloud computing environment based on the ranked list of data centers; and perform one or more actions based on the hybrid cloud computing environment.

16. The non-transitory computer-readable medium of claim 15, wherein the one or more instructions, that cause the device to select the objectives for the hybrid cloud computing environment based on the application data and the constraint data, cause the device to:

select, as the objectives, one or more of:
  regulations and policies associated with the hybrid cloud computing environment,
  sustainability of the potential data centers for the hybrid cloud computing environment,
  a cost associated with the hybrid cloud computing environment,
  interoperability of the potential data centers for the hybrid cloud computing environment, or
  privacy requirements for the hybrid cloud computing environment.

17. The non-transitory computer-readable medium of claim 15, wherein the one or more instructions, that cause the device to identify the factors associated with the objectives based on the constraint data, cause the device to:

identify, as the factors, one or more of:
  geographical locations of the potential data centers for the hybrid cloud computing environment,
  a cloud service provider for the hybrid cloud computing environment,
  a service provided by the cloud service provider for the hybrid cloud computing environment,
  costs associated with the potential data centers for the hybrid cloud computing environment, or
  privacy requirements for the hybrid cloud computing environment.

18. The non-transitory computer-readable medium of claim 15, wherein the one or more instructions, that cause the device to identify the list of data centers based on the correlated factor scores, cause the device to:

rank the potential data centers based on the correlated factor scores; and select a quantity of data centers, from the potential data centers and for the list of data centers, associated with correlated factor scores that satisfy a score threshold.

19. The non-transitory computer-readable medium of claim 15, wherein the one or more instructions, that cause the device to determine the reduced list of data centers based on the list of data centers and the constraint data, cause the device to:

identify, in the list of data centers, a set of data centers associated with geographical locations that fail to satisfy a distance threshold from locations of users of the application; and remove the set of data centers from the list of data centers to generate the reduced list of data centers.

20. The non-transitory computer-readable medium of claim 15, wherein the one or more instructions, that cause the device to perform the one or more actions, cause the device to one or more of:

provide data identifying the hybrid cloud computing environment for display;

cause the hybrid cloud computing environment to be instantiated for the application;

cause the application to be migrated to the hybrid cloud computing environment;

enable configuration of the hybrid cloud computing environment; or receive a modification for the hybrid cloud computing environment and update the hybrid cloud computing environment based on the modification.

\* \* \* \* \*